(12) United States Patent
Ogino et al.

(10) Patent No.: US 7,024,271 B2
(45) Date of Patent: Apr. 4, 2006

(54) NUMERICAL CONTROL DEVICE

(75) Inventors: Hideo Ogino, Fujiyoshida (JP);
Akinobu Fukumoto, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/821,878

(22) Filed: Apr. 12, 2004

(65) Prior Publication Data

US 2004/0210339 A1 Oct. 21, 2004

(30) Foreign Application Priority Data

Apr. 21, 2003 (JP) ............................... 2003-115427

(51) Int. Cl.
*G06F 19/00* (2006.01)
(52) U.S. Cl. ...................... 700/177; 700/187
(58) Field of Classification Search ................ 700/177, 700/187, 19, 60, 189, 178, 169, 181; 318/569, 318/573
See application file for complete search history.

(56) References Cited

U.S. PATENT DOCUMENTS

| 4,590,572 | A | | 5/1986 | Imanishi ..................... 364/474 |
| 5,010,285 | A | * | 4/1991 | Kawamura et al. ......... 318/569 |
| 6,442,436 | B1 | * | 8/2002 | Nogami ....................... 700/19 |

FOREIGN PATENT DOCUMENTS

| JP | 1-229305 | 9/1989 |
| JP | 9-282019 | 10/1997 |
| JP | 11-90880 | 4/1999 |

* cited by examiner

*Primary Examiner*—Leo Picard
*Assistant Examiner*—Steven R. Garland
(74) *Attorney, Agent, or Firm*—Staas & Halsey LLP

(57) ABSTRACT

A plurality of paths controlled by a multi-path numerical control device is divided into several groups in advance. When an alarm or single block stoppage occurs in any one path while the multi-path numerical control device is being operated, the operations of all the paths in the group to which the path belongs are stopped, whereas the operations of paths belonging to other groups are not stopped but instead continued.

2 Claims, 4 Drawing Sheets

FIG. 2

| PATH NUMBER | MACHINE GROUP |
|---|---|
| 1 | 1 |
| 2 | 1 |
| 3 | 1 |
| 4 | 2 |
| 5 | 2 |

NUMERICAL CONTROL DEVICE

BACKGROUND OF THE INVENTION

1. Field of the Invention

The present invention relates to a numerical control device that controls machine tools, and, more particularly, to a numerical control device that controls multiple paths at the same time by separating a plurality of manufacturing and work control processes such as lathing, milling, and loader control.

2. Description of the Related Art

Multi-path numerical control devices that simultaneously control a plurality of respective independent paths of manufacturing and work processes that include lathing, milling, and loader control are already commonly known. When an alarm is produced in one path, these multi-path numerical control devices either stop the operation of all the paths or continue the operation of all the paths other than the path in which the alarm was produced.

Further, in a single block operation, although the operation of a path to which a single block signal is inputted is stopped, the operation of other paths is continued. In view of this, it was proposed (See Japanese Patent Application Laid-Open No. H1-229305) that, if a single block signal is input while one block of a single-path manufacturing program is running, the manufacturing program is made to enter a single-block stoppage state while the manufacturing programs of other paths are controlled to a feed-hold state.

As mentioned above, with a conventional multi-path numerical control device, there are only two choices, which are to stop the operation of the path when an alarm is produced while continuing the operation of all the other paths, or to stop the operation of all the paths. Furthermore, with a single block stoppage operation, there are only two choices, too, which are to stop the operation of only the path with the single-block signal input and continue the operation of the other paths, or to stop the operation of the other paths in addition to the path with the single-block signal input, as disclosed in the above-mentioned Japanese Patent Application Laid Open No. H1-229305.

However, machines controlled by a multi-path numerical control device have paths associated with one another and unassociated paths that may be operated independently. In the case of associated paths, when an alarm is produced in one of these paths and the operation of this path is to be stopped, and when the operation of one path is to be stopped by means of single block stoppage, the operation of the other associated paths should be stopped. However, stoppage of unassociated paths is not required. Nevertheless, there is the problem that the work efficiency drops because, conventionally, the operation of all the paths including the operation of unassociated paths is stopped with stability in mind.

SUMMARY OF THE INVENTION

The present invention is a multi-path numerical control device that analyzes a program of each path and controls each path on the basis of the program. The multi-path numerical control device comprises: means for dividing the paths into groups and storing the result of this division as group information; and group-unit stoppage control means that, when an alarm is produced or single block stoppage occurs in any of the paths during operation of the multi-path numerical control device, stop the operation of all the paths belonging to the group to which the path in which the alarm or single block stoppage was produced belongs on the basis of the group information. With this constitution, the operation of only a set group is stopped when an alarm or single block stoppage is produced. Further, the numerical control device may further comprise selection means for selecting and establishing whether to validate the function of the group-unit stoppage control means or to stop and invalidate this function.

With the above configuration, according to the multi-path numerical control device of the present invention, paths whose operation is to be simultaneously stopped when the operation of a specific path is stopped in the event of an alarm or single block stoppage can be optionally selected.

BRIEF DESCRIPTION OF THE DRAWINGS

These and further objects and characteristics of the present invention will become evident from the description of the following embodiment with reference to the attached drawings, in which:

FIG. 2 is an explanatory view of an example in which paths are grouped, set, and stored, according to the embodiment in FIG. 1;

DESCRIPTION OF THE EMBODIMENTS

Figure 1:
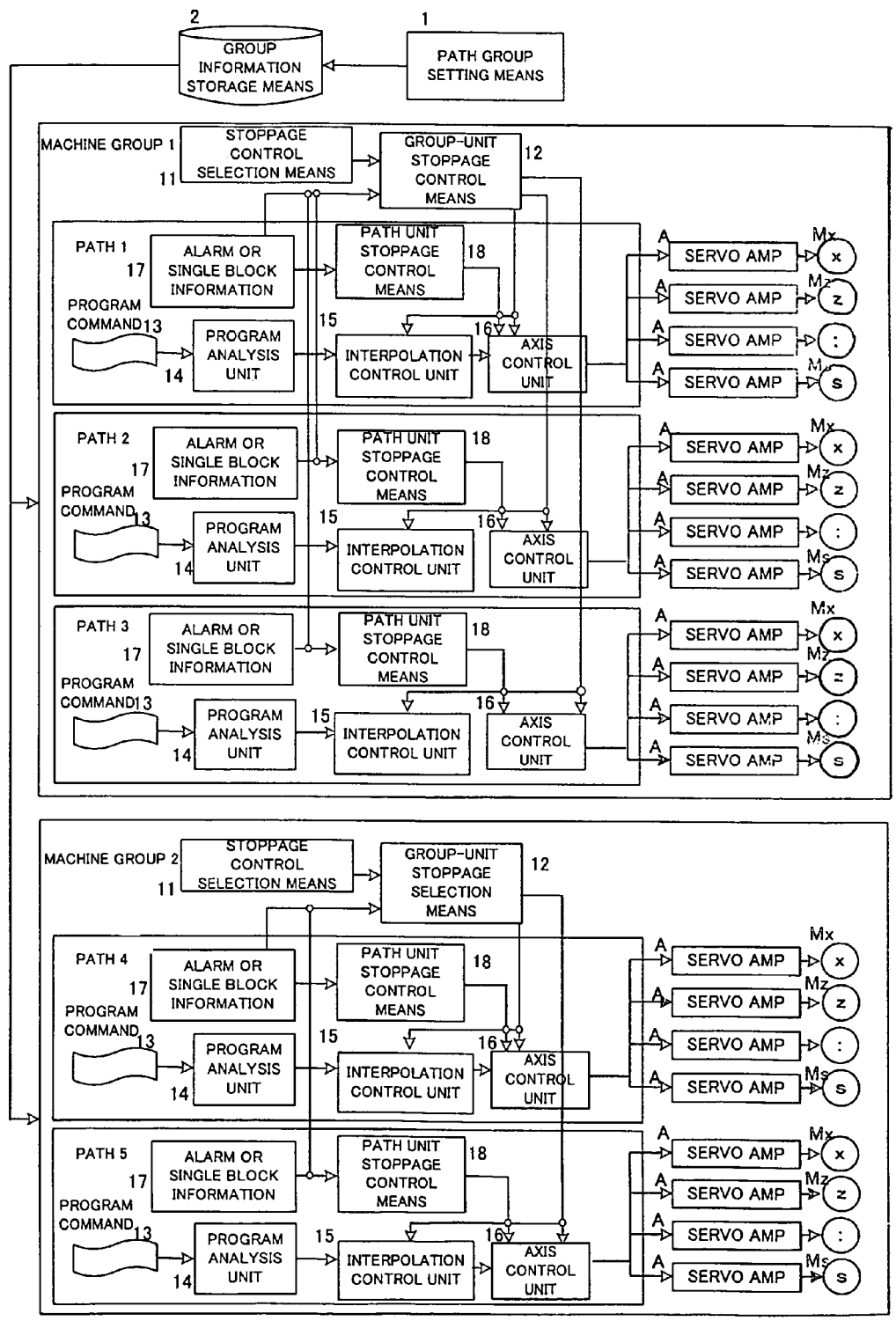
FIG. 1 is an outline of a block diagram of the multi-path numerical control device according to one embodiment of the present invention.
Figure 2:
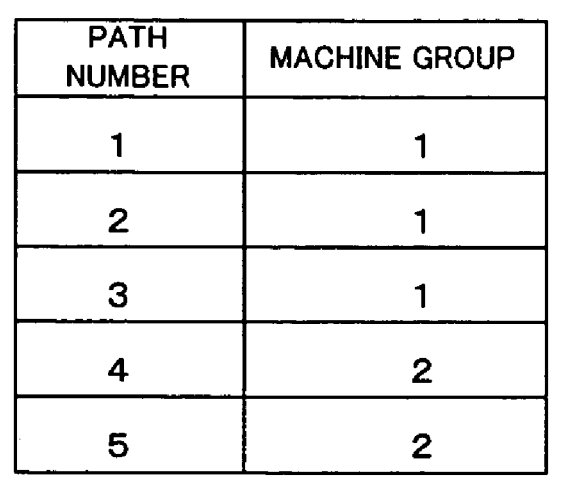

FIG. 1 is an outline of a block diagram of the multi-path numerical control device according to one embodiment of the present invention. In the example in FIG. 1, the multi-path numerical control device controls five paths (paths 1 to 5). Path group setting means 1, which are constituted by a keyboard or the like of a display/operating control panel connected to the multi-path numerical control device comprises, select (group) paths whose operation is to be stopped when an alarm is produced in any given path or this path is subject to single block stoppage, and input and set this group information in advance. The group information storage means 2 store the path-group information that has been input and set. In the example shown in FIG. 1, settings have been made so that paths 1 to 3 belong to machine group 1 and paths 4 and 5 belong to machine group 2, as shown in FIG. 2.

In addition, machine groups 1 and 2 each comprises stoppage control selection means 11, which establish the selection of whether to stop the operation of the whole group (hereinafter referred to as group stoppage) when alarm information or single block stoppage information 17 is produced by one path belonging to these respective groups, and also comprise group-unit stoppage control means 12 that stop the operation in group units.

Furthermore, paths 1 to 5 each comprise a program analysis unit 14, an interpolation control unit 15, an axis control unit 16, and path-unit stoppage control means 18. The program analysis unit 14 analyzes commands 13 for each control axis from a manufacturing program, which is issued to each path. The interpolation control unit 15 subjects the movement commands analyzed by the program analysis unit 14 to interpolation control. The axis control unit 16 performs position and velocity feedback control, as well as current feedback control, on the basis of movement commands for each control axis determined by the interpolation control unit 15 and position and velocity feedback signals from a position/velocity detector (not shown). A PWM (pulse width modulation) signal, which is output by the axis control unit 16, is output to the servo amp A of each control axis and controls the drive of servo motors Mx, Mz, . . . Ms of each control axis.

When an alarm is produced due to the generation of an irregular operation for any given reason or when a program is subject to single block stoppage in accordance with a single block operation, the path-unit stoppage control means 18 stop the operation of the relevant path by means of the alarm or single block stoppage information 17. The interpolation control unit 15 or axis control unit 16 stops the operation of the paths in accordance with the operation stoppage command from the path-unit stoppage control means 18.

In cases where stoppage is due to an alarm, depending on the level of the alarm, block end stoppage, which stops a program at the end of a command block, deceleration stoppage, which terminates a program in the course of a command block, and instantaneous stoppage, which stops the operation instantly by shutting off the excitation of the motor. In the case of block end stoppage or deceleration stoppage, the operation is stopped by outputting an operation stoppage command to the interpolation control unit 15, and, in the case of instantaneous stoppage, the operation is stopped by outputting an operation stoppage command to the interpolation control unit 15 and axis control unit 16. The remaining operational control of each path in no way differs from the operational control of the prior art multi-path numerical control devices.

The present invention differs from the prior art multi-path numerical control devices in that the operation is also stopped by an operation stoppage command from the group-unit stoppage control means 12.

When settings are made by the stoppage control selection means 11 to stop the operation of all the paths in a group when alarm information or single block stoppage information 17, or the like, is produced in any of the paths in a set group, the group-unit stoppage control means 12 receive alarm information or single block stoppage information 17, or the like and then output an operation stoppage command to the interpolation control unit 15 or axis control unit 16 of all the paths in the group. Thus, the operation of each path in the group is stopped in the same way as in a case where an operation is stopped by means of an operation stoppage command from the path-unit stoppage control means 18.

For example, in this embodiment, in case where group stoppage by means of alarm information or single block stoppage information 17 is set for neither machine group 1 nor machine group 2, the operation of only the path where an alarm or single block stoppage is produced by alarm information or single block stoppage information 17 is stopped by an operation stoppage command output from the path-unit stoppage control means 18 of that path.

On the other hand, in case where group stoppage by means of alarm information or single block stoppage information 17 is set for both machine groups 1 and 2, if alarm information or single block stoppage information 17 is produced by one path belonging to either of machine groups 1 and 2, an operation stoppage command is output from the group-unit stoppage control means 12 in the group to the axis control unit 16 of each of the paths belonging to the group, with the result that the operation of individual paths in the group is stopped. For example, if alarm information or single block stoppage information 17 is produced in path 1, the operations of all the paths in machine group 1 (paths 1, 2, and 3) to which this path 1 belongs are stopped, whereas the operations of paths 4 and 5, which belong to the other machine group, are not stopped but instead run without interruption. Further, if alarm information or single block stoppage information 17 is produced in path 5, the operations of all the paths in machine group 2 (paths 4 and 5) to which this path 5 belongs are stopped, whereas the operations of paths 1, 2 and 3 belonging to the other machine group are not stopped but instead run without interruption.

As described above, in the case of a multi-path numerical control device, if paths whose operation is to be stopped together in the event of an alarm, single block stoppage or the like are grouped and these groups are set, then the multi-path numerical control device is capable of stopping the operations of all the paths in the group when alarm or single block stoppage information 17 is produced in one path in the group.

Further, in the above embodiment, when group stoppage is set, the operation of the paths in the group is stopped if either alarm information or single block stoppage information is generated. However, the decision of whether group stoppage is to be performed or not may be set for individual paths by distinguishing alarm information and single block stoppage information instead.

Figure 3:
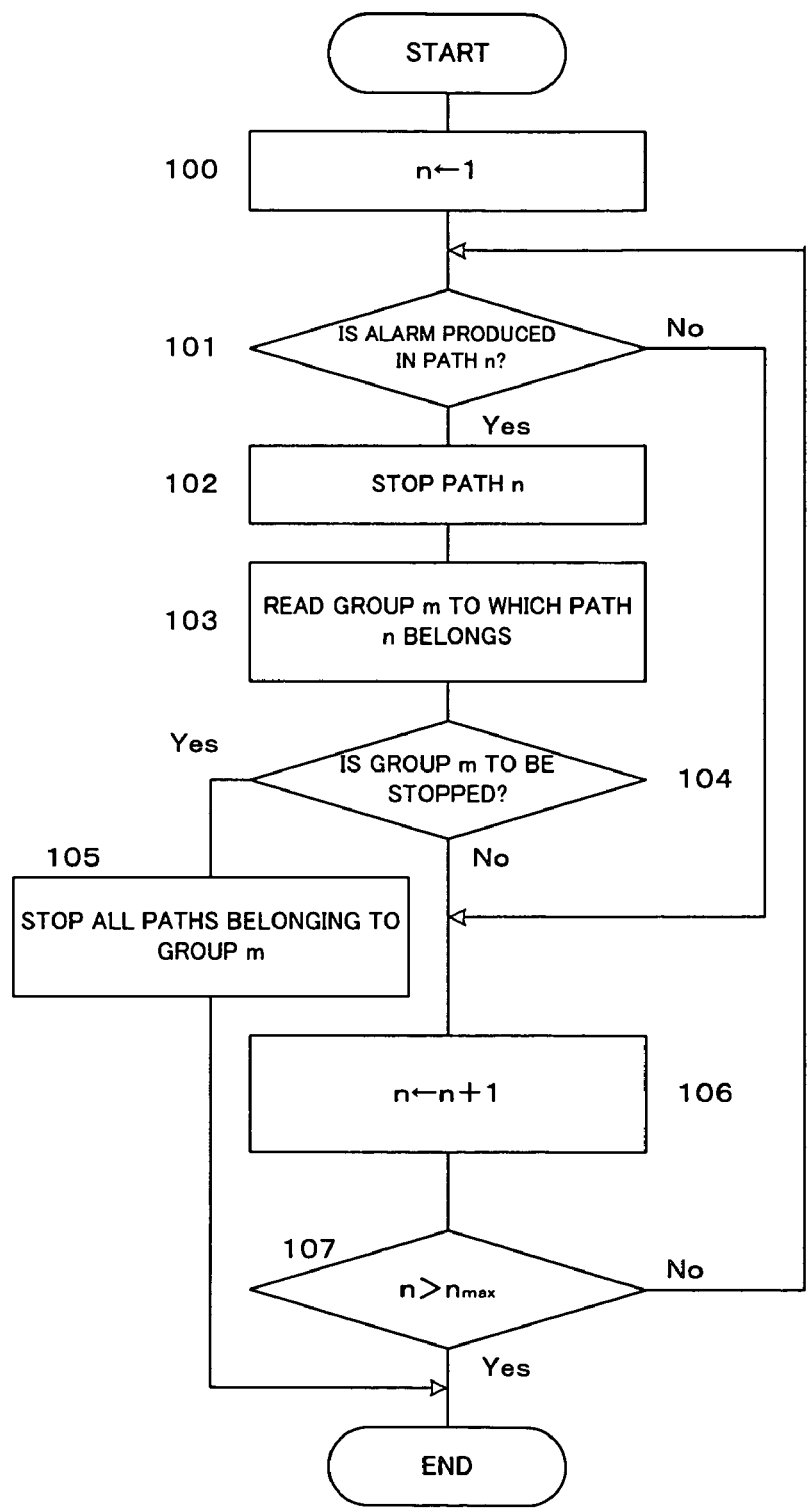
FIG. 3 is a flowchart of the alarm operation-stoppage processing performed by the multi-path numerical control.; device in FIG. 1.

FIG. 3 is a flowchart for processing to be implemented by the processor of the multi-path numerical control device when the operation is stopped by means of alarm information, according to the present embodiment. This processing is implemented in predetermined cycles.

The processor sets the index n for counting the number of paths to '1' (step 100) and judges whether or not alarm information has been produced by the path indicated by index n (step 101). If alarm information has not been produced, the processing proceeds to step 106 in which index n is incremented by '1'. The processor then judges whether index n then exceeds the number of paths nmax (nmax=6 in the example of FIG. 1) that the multi-path numerical control device comprises (step 107). If this number has not been exceeded, the processing returns to step 101, and if this number has been exceeded, the processor terminates the processing in the present cycle.

If, on the other hand, the processor judges in step 101 that alarm information has been produced, the processor stops the operation of the path producing this alarm information (step 102) and reads (step 103) the machine group m to which the path n, indicated by index n that was set and stored (see FIG. 2) by machine group information storage means 2, belongs. The processor then judges (step 104) whether or not group stoppage (stoppage of the operations of all the paths in the group to which the path where alarm information is generated belongs) has been set for the machine group m thus read. When such group stoppage has not been set, the processing proceeds to steps 106 without further processing. When, on the other hand, such group stoppage has been set, the processor stops the operation of all the paths belonging to group m (step 105) and then terminates the processing in the present cycle.

Figure 4:
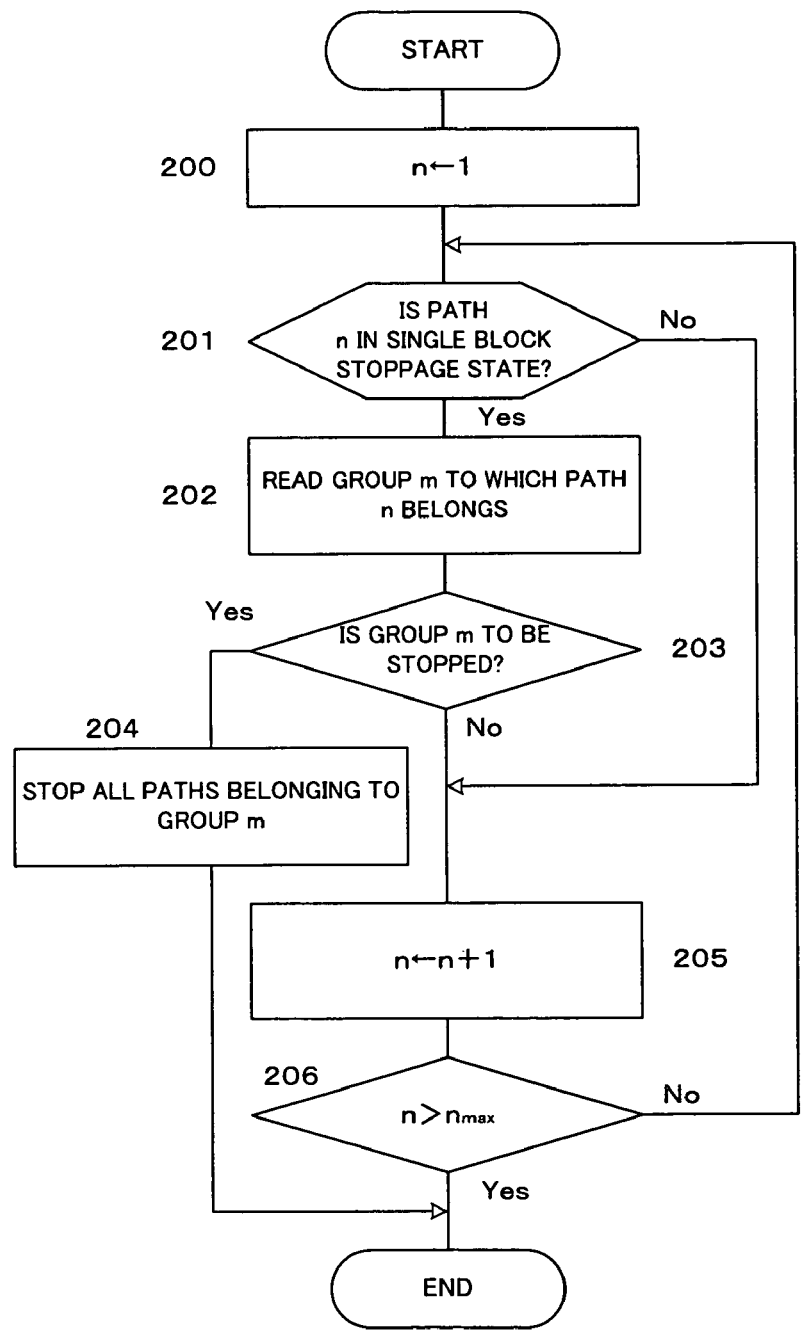
FIG. 4 is a flowchart of the operation stoppage processing by single-block stoppage performed by the multi-path numerical control device in FIG. 1.

FIG. 4 is a flowchart of the processing implemented by the processor of the multi-path numerical control device when the operation is stopped in accordance with single block stoppage, according to the present embodiment. This processing is implemented in predetermined cycles.

This processing resembles the processing shown in FIG. 3 but differs in that the processor judges whether to perform group stoppage in accordance with single block stoppage information rather than alarm information. That is, index n is set to '1' (step 201) and the processor judges (step 201) whether or not single block stoppage information has been produced in path n indicated by index n. If single block stoppage information has not been produced, the processing proceeds to step 205, and, if single block stoppage information has been produced, the processing of processing steps 202 to 206, which is the same processing as that in steps 103 to 107 shown in FIG. 3, is then executed. That is, the processor reads group m to which path n belongs and judges whether group stoppage has been set for group m. If group stoppage has not been set, the processor increments index n by 1 and, if index n does not then exceed the maximum number of paths nmax that the multi-path numerical control device comprises, the processing returns to step 201. If index n exceeds the maximum number of paths nmax, the processor terminates the processing in the present cycle. Further, when group stoppage has been set for group m, the processor stops the operation of all the paths belonging to group m and terminates the processing in the present cycle.

Further, although processing to judge alarm generation or single block stoppage is performed separately in the above embodiment, these judgments may be executed at the same time. In this case, the judgment of step 102 in FIG. 3 then becomes a judgment of whether path n produces alarm information or path n is in a single block stoppage state. In the absence of both alarm information and a single block stoppage state, the processing proceeds to step 106, where, if either alarm information or single block stoppage information has been generated, the processing may proceed to step 105.

In the case of the multi-path numerical control device according to the present invention, when alarm operation stoppage or single block stoppage takes place in one path, the operation of this path can be stopped together with paths for which operation stoppage is desired, while the operation of other paths can be continued. As a result, stability can be ensured and manufacturing and work efficiency can be improved.

The invention claimed is:

1. A multi-path numerical control device that analyzes a program of each path and controls each path in accordance with the program, comprising:
    means for dividing the paths into groups and storing a result of this division as group information;
    means for controlling group-unit stoppage when an alarm is detected in any of the paths during operation of the multi-path numerical control device, stopping the operation of all the paths belonging to the group where the alarm was detected in accordance with the group information; and
    means for selecting whether to validate a function of the means for controlling group-unit stoppage or to invalidate and stop the function.

2. A multi-path numerical control device that analyzes a program of each path and controls each path in accordance with the program, comprising:
    means for dividing the paths into groups and storing a result of this division as group information;
    means for controlling group-unit stoppage when any of the paths undergoes single-block stoppage during operation of the multi-path numerical control device, stopping the operation of all the paths belonging to the group where the single-block stoppage occurred in accordance with the group information; and
    means for selecting whether to validate a function of the means for controlling group-unit stoppage or invalidate and stop the function.

* * * * *

UNITED STATES PATENT AND TRADEMARK OFFICE
CERTIFICATE OF CORRECTION

PATENT NO. : 7,024,271 B2 Page 1 of 1
APPLICATION NO. : 10/821878
DATED : April 4, 2006
INVENTOR(S) : Hideo Ogino et al.

It is certified that error appears in the above-identified patent and that said Letters Patent is hereby corrected as shown below:

Correct the specification as shown below:
Column 2, line 27, after "control" delete ".;"

Signed and Sealed this

Third Day of October, 2006

JON W. DUDAS
*Director of the United States Patent and Trademark Office*